Patented Dec. 15, 1942

2,305,545

UNITED STATES PATENT OFFICE 2,305,545

ORGANIC MERCURY COMPOUNDS AS DISINFECTANTS

Vartkes Migrdichian, Greenwich, Conn., assign to American Cyanamid Company, New Yo N. Y., a corporation of Maine No Drawing. Application December 3, 1940, Serial No. 368,362

15 Claims. (Cl. 167—22)

The present invention relates to new disinfectants, and more particularly to certain organic mercury compounds which are especially effective against plant pests and microorganisms with the result that they may be used for all purposes of preserving and disinfecting, for example, the immunizing of seed grain, the prevention of mildew formation, the preservation of wood, in the preservation of glue and the like.

These new disinfectants comprise organic derivatives of mercury represented by the general formula:

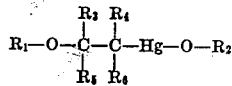

in which $R_1$ denotes an organic group attached to oxygen by means of a valence of carbon, said group containing, in addition to hydrogen, at least one negative substituent, e. g. cyanogen, thiocyanogen, halogen, alkyloxy, carbalkoxyl and the like, $R_2$ denotes alkyl, aryl, or aralkyl radicals, and $R_3$, $R_4$, $R_5$ and $R_6$ denote hydrogen, alkyl, aryl or aralkyl radicals.

In producing mercury compounds of this type, the acetate salts of said compounds are first prepared by the interaction of a hydroxy compound containing at least one negative substitutent such, for example, as ethylene chlorhydrin, monomethyl glycol ether, monoethyl glycol ether, glycolic nitrile, acetaldehyde cyanhydrin, ethyl lactate and the like, a compound containing an ethylenic linkage such, for example, as ethylene itself, propylene, isobutylene, styrene, and the like, and mercuric acetate.

The acetates thus formed are converted by dilute hydrochloric acid or a sodium chloride solution to the corresponding chloride compounds, and by simple metathesis from the latter and a sodium alcoholate in alcoholic solution these new products may be readily obtained.

The reactions leading to the formation of β-chlorethoxyethyl mercury ethoxide, a typical example of the foregoing compounds, may be illustrated by the following equations:

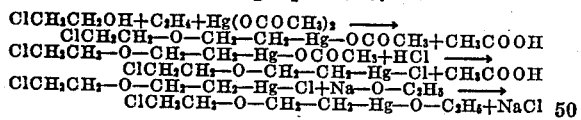

As showing the wide diversity of compounds which may be used for the purposes of this invention, the following may be mentioned: β-methoxy-ethyloxyethyl mercury methoxide, β-methoxyethyloxyethyl mercury benzyloxide, β-ethoxyethyloxyethyl mercury ethoxide, β-ethoxyethyloxyethyl mercury phenyloxide, β-ethoxyethyloxyethyl mercury benzyloxide, β-chlorethoxyethyl mercury methoxide, β-chlorethoxyethyl mercury ethoxide, β-chlorethoxyethyl mercury butoxide, β-chlorethoxyethyl mercury benzyloxide, cyanmethoxyethyl mercury ethoxide, cyanmethoxyethyl mercury phenyloxide, α-carbethoxyethyloxyethyl mercury ethoxide, β-chlorethoxypropyl mercury methoxide, β-chlorethoxypropyl mercury benzyloxide, β-chlorethoxybutyl mercury methoxide, β-chlorethoxybutyl mercury ethoxide and β-chlorethoxyphenylethyl mercury methoxide.

The above class of mercury compounds possess high fungicidal power and have been found particularly valuable for use as dusting disinfectants in combating seed diseases. Excellent control of the fungus diseases of seed corn may be obtained with dust mixtures containing as low as one per cent of the active compound. Other plants whose seeds may be advantageously disinfected in accordance with this invention include ryl, oats, barley, maize, wheat, peas, beans, potatoes, etc.

These new disinfectants are also highly efficacious against plant pests and microorganisms, such as insects, bacteria, moulds and the like, with the result that they may be employed for all purposes of preserving or disinfecting, for example, the immunizing of seeds, the preservation of wood, the prevention of mildew formation, in the preservation of glue, in insecticidal compositions and the like.

The invention is further illustrated by the following examples.

Example 1

Seed corn, infected by Fusarium, is dusted in the ratio of 1000 to 16 with a mixture consisting of 99 parts by weight of talc and one part by weight of β-methoxyethyloxyethyl mercury methoxide of the formula:

Germination of the fungi spores is prevented.

Example 2

β-methoxyethyloxyethyl mercury benzyl oxide of the formula:

is used in a manner similar to the procedure of Example 1.

Example 3

One gram of dust consisting of 97 parts by weight of talc and 3 parts by weight of the mercury compound, β-chlorethoxyethyl mercury ethoxide $$(ClCH_2CH_2\text{—}O\text{—}CH_2\text{—}CH_2\text{—}Hg\text{—}O\text{—}C_2H_5)$$

is placed in a stoppered four-ounce bottle. Fifty corn seeds, Gibberella infected, held in a sack suspended in the bottle, are exposed to the vapors of the mercury compound for one week. Upon germination of the exposed seeds it is found that the germination of fungi spores is averted.

*Example 4*

An immunizing agent consisting of one part by weight of α-carbethoxyethyloxyethyl mercury ethoxide $$(CH_3CH(COOC_2H_5)\text{—}O\text{—}CH_2\text{—}CH_2\text{—}Hg\text{—}O\text{—}C_2H_5)$$

and 99 parts by weight of talc is dusted onto seed corn, Diplodia infected, in the proportion of 1.5 ounces of dust to one bushel of corn. Germination of the fungi spores is prevented.

*Example 5*

Cyanmethoxyethyl mercury phenyloxide of the formula:

$$CNCH_2\text{—}O\text{—}CH_2\text{—}CH_2\text{—}Hg\text{—}O\text{—}C_6H_5$$

is used in a manner similar to the procedure of Example 4.

It is to be understood that the foregoing examples are merely illustrative and that this invention may be applied to the wide variety of organic compounds represented by the general formula given. Also, it is believed that the mercury compounds herein disclosed and the methods of producing the same are not formerly known.

Although these mercury compounds may be used alone, it is usually preferable to mix them with inert fillers or spreading materials such as talc, bentonite, kieselguhr, fuller's earth, pumice, silica, silicates, chalk, etc. These inert materials are preferably in a finely divided state, as are the mercury compounds, and mixtures of the ingredients are easily prepared in any well-known manner. The proportions of the ingredients in the finished dust may be varied widely in accordance with the particular effects desired and the conditions under which they are to be used. Under some circumstances it may be desirable and feasible to apply the present compounds in the form of solutions or suspensions in water or other liquid, and the present invention does not preclude such use.

While the invention has been described with particular reference to specific embodiments, it is to be understood that it is not to be limited thereto but is to be construed broadly and restricted solely by the scope of the appended claims.

I claim:

1. The method of protecting organic materials subject to attack by plant pests and microorganisms which comprises treating the said materials with an organic mercury compound of the general formula:

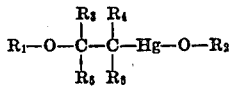

in which $R_1$ denotes an organic group containing in addition to hydrogen at least one negative substituent, $R_2$ is selected from the group consisting of alkyl, aryl and aralkyl radicals, and $R_3$, $R_4$, $R_5$ and $R_6$ are selected from the group consisting of hydrogen, alkyl, aryl and aralkyl radicals.

2. The method of protecting organic materials subject to attack by plant pests and microorganisms which comprises treating the said materials with an organic mercury compound of the general formula:

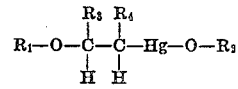

in which $R_1$ denotes an organic group containing in addition to hydrogen at least one negative substituent, $R_2$ is selected from the group consisting of alkyl, aryl and aralkyl radicals, and $R_3$ and $R_4$ are selected from the group consisting of hydrogen, alkyl, aryl and aralkyl radicals.

3. The method of protecting organic materials subject to attack by plant pests and microorganisms which comprises treating the said materials with an organic mercury compound of the general formula:

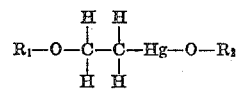

in which $R_1$ denotes an organic group containing in addition to hydrogen at least one negative substituent, and $R_2$ is selected from the group consisting of alkyl, aryl and aralkyl radicals.

4. The method of protecting organic materials subject to attack by plant pests and microorganisms which comprises treating the said materials with an organic mercury compound of the general formula:

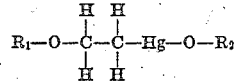

in which $R_1$ denotes an organic group containing in addition to hydrogen a negative substituent selected from the group consisting of cyanogen, thiocyanogen, halogen, alkyloxy and carbalkoxyl radicals, and $R_2$ denotes an alkyl radical.

5. The method of protecting organic materials subject to attack by plant pests and microorganisms which comprises treating the said materials with an organic mercury compound of the general formula:

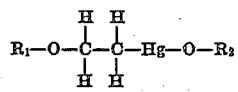

in which $R_1$ denotes an organic group containing in addition to hydrogen a negative substituent selected from the group consisting of cyanogen, thiocyanogen, halogen, alkyloxy and carbalkoxyl radicals, and $R_2$ denotes an aralkyl radical.

6. The method of protecting organic materials subject to attack by plant pests and microorganisms which comprises treating the said materials with an organic mercury compound of the general formula:

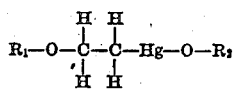

in which $R_1$ denotes an organic group containing in addition to hydrogen a negative substituent selected from the group consisting of cyanogen, thiocyanogen, halogen, alkyloxy and carbalkoxyl radicals, and $R_2$ denotes an aryl radical.

7. The method of immunizing seed which comprises treating said seed with an organic mercury compound of the general formula:

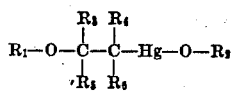

in which $R_1$ denotes an organic group containing in addition to hydrogen at least one negative substituent, $R_2$ is selected from the group consisting of alkyl, aryl and aralkyl radicals, and $R_3$, $R_4$, $R_5$ and $R_6$ are selected from the group consisting of hydrogen, alkyl, aryl and aralkyl radicals.

8. The method of immunizing seed which comprises treating said seed with an organic mercury compound of the general formula:

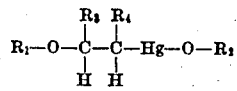

in which $R_1$ denotes an organic group containing in addition to hydrogen at least one negative substituent, $R_2$ is selected from the group consisting of alkyl, aryl and aralkyl radicals, and $R_3$ and $R_4$ are selected from the group consisting of hydrogen, alkyl, aryl and aralkyl radicals.

9. The method of immunizing seed which comprises treating said seed with an organic mercury compound of the general formula:

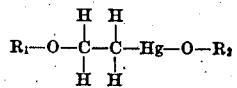

in which $R_1$ denotes an organic group containing in addition to hydrogen at least one negative substituent, and $R_2$ is selected from the group consisting of alkyl, aryl and aralkyl radicals.

10. The method of immunizing seed which comprises treating said seed with an organic mercury compound of the general formula:

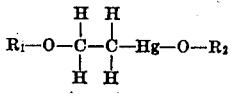

in which $R_1$ denotes an organic group containing in addition to hydrogen a negative substituent selected from the group consisting of cyanogen, thiocyanogen, halogen, alkyloxy and carbalkoxyl radicals, and $R_2$ denotes an alkyl radical.

11. The method of immunizing seed which comprises treating said seed with an organic mercury compound of the general formula:

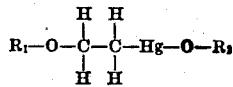

in which $R_1$ denotes an organic group containing in addition to hydrogen a negative substituent selected from the group consisting of cyanogen, thiocyanogen, halogen, alkyloxy and carbalkoxyl radicals, and $R_2$ denotes an aralkyl radical.

12. The method of immunizing seed which comprises treating said seed with an organic mercury compound of the general formula:

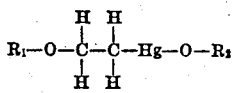

in which $R_1$ denotes an organic group containing in addition to hydrogen a negative substituent selected from the group consisting of cyanogen, thiocyanogen, halogen, alkyloxy and carbalkoxyl radicals, and $R_2$ denotes an aryl radical.

13. The method of immunizing seed which comprises treating said seed with an organic mercury compound of the formula:

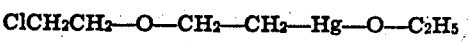

14. The method of immunizing seed which comprises treating said seed with an organic mercury compound of the formula:

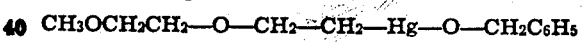

15. The method of immunizing seed which comprises treating said seed with an organic mercury compound of the formula:

VARTKES MIGRDICHIAN.